(12) United States Patent
Robertson et al.

(10) Patent No.: US 7,523,405 B2
(45) Date of Patent: Apr. 21, 2009

(54) DISPLAYING 2D GRAPHIC CONTENT USING DEPTH WELLS

(75) Inventors: George G Robertson, Seattle, WA (US); Daniel C Robbins, Seattle, WA (US); Desney S Tan, Kirkland, WA (US); Kenneth P Hinckley, Redmond, WA (US); Maneesh Agrawala, Seattle, WA (US); Mary P Czerwinski, Woodinville, WA (US); Patrick Markus Baudisch, Seattle, WA (US); Gonzalo A Ramos, Toronto (CA)

(73) Assignee: Microsoft Corporation, Redmond, WA (US)

( * ) Notice: Subject to any disclaimer, the term of this patent is extended or adjusted under 35 U.S.C. 154(b) by 506 days.

(21) Appl. No.: 11/280,635

(22) Filed: Nov. 16, 2005

(65) Prior Publication Data

US 2007/0113198 A1    May 17, 2007

(51) Int. Cl.
*G06F 3/048* (2006.01)
(52) U.S. Cl. .............. 715/766; 715/768; 715/788; 715/790; 715/794; 715/795; 715/796; 715/797
(58) Field of Classification Search .............. 715/790
See application file for complete search history.

(56) References Cited

U.S. PATENT DOCUMENTS

| | | | | |
|---|---|---|---|---|
| 4,574,364 A * | 3/1986 | Tabata et al. | ............... | 715/798 |
| 5,497,454 A * | 3/1996 | Bates et al. | ............... | 715/799 |
| 5,499,334 A * | 3/1996 | Staab | ............... | 715/778 |
| 5,561,757 A * | 10/1996 | Southgate | ............... | 715/790 |
| 5,590,265 A * | 12/1996 | Nakazawa | ............... | 715/790 |
| 5,651,107 A * | 7/1997 | Frank et al. | ............... | 715/768 |
| 6,040,833 A * | 3/2000 | Henshaw | ............... | 715/794 |
| 6,075,531 A * | 6/2000 | DeStefano | ............... | 715/788 |
| 6,549,218 B1 * | 4/2003 | Gershony et al. | ............... | 715/781 |
| 6,996,783 B2 * | 2/2006 | Brown et al. | ............... | 715/790 |
| 7,054,478 B2 * | 5/2006 | Harman | ............... | 382/154 |
| 2004/0261037 A1 * | 12/2004 | Ording et al. | ............... | 715/788 |

\* cited by examiner

*Primary Examiner*—Tadesse Hailu
*Assistant Examiner*—Alvin H Tan
(74) *Attorney, Agent, or Firm*—Amin, Turocy & Calvin, LLP

(57) ABSTRACT

Displaying the relative depth of 2D image objects while preserving the visual attributes of the objects is disclosed. After an object group is determined, the members of the object group are temporarily moved away from a center location while preserving the object group members' positions relative to each other in the X-Y plane. A depth well is displayed at the center location and each object group member is connected to a ring-beam in the depth well. In response to a control action indicating a relative depth adjustment of an object group member relative to the remaining object group members, the depth of the object relative to the remaining object group members is changed. In response to a control action indicating the depth adjustment is complete, object group members are returned to their original positions in the X-Y plane with the adjusted object displayed at the object's new relative depth. Dragging object group member into the upper or lower part of another group member are control actions indicating a relative depth adjustment of an object group member.

21 Claims, 8 Drawing Sheets

DISPLAYING 2D GRAPHIC CONTENT USING DEPTH WELLS

BACKGROUND

Computing devices enabled with appropriate software programs can be used to create images that are viewed on a display or rendered in another medium such as print or video. Software programs that enable creating computing device images are generically referred to herein as "graphic applications." Graphic applications may be primarily used to create images or may provide image creation functions in addition to functions not directly related to image creation. An important subset of graphic applications are two-dimensional, i.e., 2D, graphic applications, which are used for drawing, painting, printing, image editing, photo editing, video editing, etc.

A common problem in 2D graphic applications is accessing and changing the relative depth of occluded visual objects in a 2D graphic image. For example, during the construction of a 2D drawing, a visual object, e.g., a object, may completely overlap another object causing the overlapped object to become occluded. Because the underlying object is no longer visible, it may be difficult or impossible to select the underlying object. Even if part of the underlying object is visible, the exposed part may be too small to be easily accessible. Complete or partial occlusion problems can occur whether the visual objects are discretely defined objects, i.e., objects with well-defined borders, or objects with blurred edges such as in a photographic image. If a visual object, i.e., an object, cannot be selected, it is difficult to apply an action to the object such as changing the relative depth of the object.

It is convenient to think of a group of overlapping objects as a stack of infinitely thin paper cutouts. In this model, there is no true depth dimension, only dimensions along the X axis and Y axis. There is a depth order that is referred to as the "Z-order" because it is defined along the Z axis. The infinitely thin paper cutouts, i.e., objects, are stacked in Z-order with each object having a Z index indicating the object's location in the stack. Depending on the graphics system used, the ordering may be front to back, i.e., 0 index in front, or back to front, i.e., 0 index in back. For the problem of accessing overlapping objects, the relative order of the object is of more concern than the absolute ordering. In a stack of overlapping objects, an overlapping object is the "upper" object and the overlapped and perhaps occluded object is the "lower" object.

Barring other affordances, selecting and manipulating occluded objects requires an upper object to be moved in the X-Y plane in order to access a lower object. Unless there is an easy way to retain the original X-Y location of the upper object, it may be difficult to return the moved upper object to the upper object's original location. To avoid changing the X-Y location of objects, there are controls that enable successively cycling through a stack of objects until an object is "lifted" or "sunk" to the desired Z-index. Another approach that preserves X-Y locations is a scene index. A scene index is an ordered linear list of thumbnails, i.e., small pictures, of the objects in an image. Moving an object's thumbnail up or down in the scene index causes the object to move up or down, i.e., changes the Z-index of the object.

Moving occluding objects and cycling objects are viable solutions to the occluded content problem until the total number of objects in an image grows large. For example, given a dozen or so objects, moving occluding objects or cycling through objects often requires adjusting each object more than once. The more objects in a stack of objects, the more likely it is that each object will need to be adjusted. Using a scene index is less troublesome in this respect, but has another limitation. The thumbnails in a scene index tend to reduce or eliminate identifying features of objects, e.g., shape, color, size, position. For example, if there are a half-dozen red circles of varying sizes and shades in an image, all six images may appear as similarly sized red circles in the scene index. Another disadvantage of a scene index is that in order to include every object in an image, a scene index can grow larger than screen height requiring the user to scroll through the scene index.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method and apparatus, including computer-readable medium, for providing relative depth adjustment of objects in a 2D image while preserving the visual attributes of the objects is disclosed. After an object group is selected, object group members are temporarily moved away from the object group's center while preserving the positions of the object group members relative to each other in the X-Y plane. Then, a depth well is displayed at the object group's center and each object group member is connected to the depth well. In response to a control action indicating a relative depth adjustment of an object group member relative to the remaining object group members, the depth of the object relative to the remaining object group members is changed. In response to a control action indicating that the depth adjustment is complete, object group members are returned to their original positions in the X-Y plane with the adjusted object being located at the new relative depth.

Visual attributes comprise shape, color, size, and X-Y position. An object group may be formed from a selected object and objects that overlap the selected object, a plurality of selected objects, or a plurality of otherwise collected objects.

Dragging an object group member into the upper or lower part of another object group member are control actions indicating a relative depth adjustment of an object group member relative to the other object group member.

Ring and beam pairs employed in the depth well may be differentiated by color. The depth of a ring and beam pair may be indicated using transparency. Ghost images of the object group members in the object group members' original positions may be displayed.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION 2D graphic applications are supported by a graphical user interface (GUI). A GUI is a computer software component, executed by a computing device, that presents visual elements, i.e., objects, in a display. Objects presented by a GUI in a display are pointed to by moving a cursor. A cursor is a small graphic symbol, e.g., an arrow, that can be moved around a display by manipulating a physical pointing device, such as a computer mouse. An object presented by a GUI in a display is pointed to by moving the physical pointing device until the cursor is positioned "over" the object. After a cursor is positioned over an object, the object can be selected by pressing and releasing a mouse button without moving the cursor. An object may also be "dragged." After a cursor is positioned over an object, the object can be selected by pressing the mouse button, holding down the mouse button, and moving the cursor causing the object to be dragged along with the cursor. After the object is dragged to the desired position, the mouse button is released and the object remains in the desired position. Preferably, in 2D graphic applications supported by GUIs, objects or portions of object are visible to allow clicking on the objects to select the objects.

Figure 1A:
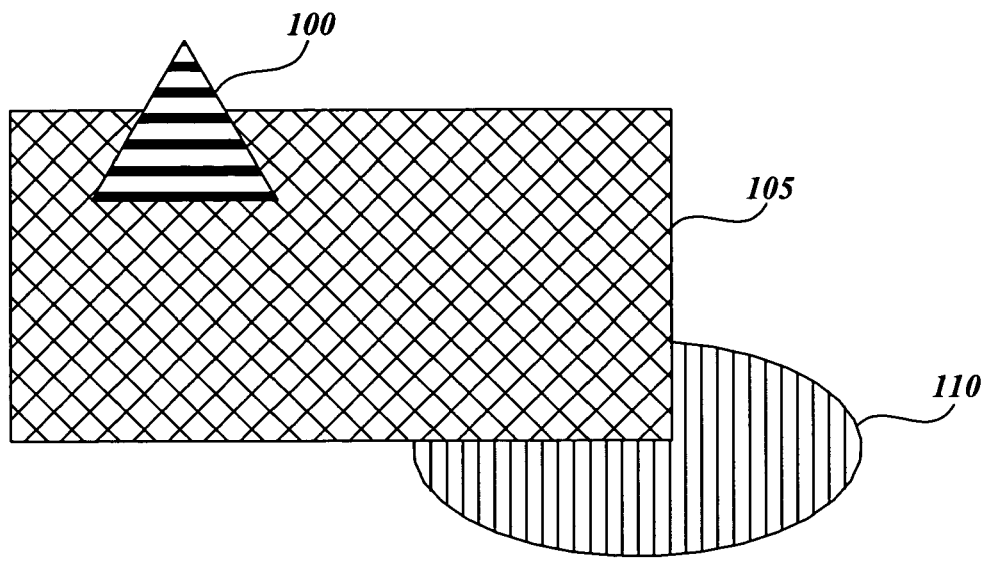
FIG. 1A is an exemplary 2D image comprising an object group with three overlapping object group members: a triangle in front of a rectangle which is in front of an oval.

Objects in 2D graphic application images may overlap. An example of a 2D graphic application image containing exemplary overlapped objects is shown in FIG. 1A. Triangle 100 overlaps rectangle 105 which in turn overlaps oval 110. Because triangle 100 overlaps rectangle 105 which in turn overlaps oval 110, triangle 100, rectangle 105, and oval 110 comprise a particular group of objects, i.e., an object group. An object group may also be formed from a plurality of explicitly selected objects or a plurality of objects selected based on characteristics other than overlap, e.g., objects of a certain color or shape. Hence, forming an object group by selecting overlapping objects should be construed as exemplary and not limiting. For illustrative clarity, the exemplary objects shown in FIG. 1A do not overlap to the point of occluding one another. Though there is no occlusion in the object group shown in FIG. 1A, the object group shown in FIG. 1A illustrates the starting point for a good example of how object group members can be made more easily accessible. To begin the process of making the object group members in the image shown in FIG. 1A more easily accessible, the object group members are moved away from each other, i.e., spread, so that the object group members no longer overlap. The positions of the object group members are preserved relative to each other in the X-Y plane.

Preferably, the action of moving the object group members away from each other is visible and performed at a slow enough speed that the action is perceptible by users. Also preferably, a "ghost image" of each of the object group members are rendered in the object group member's original position. A ghost image is an image of an object rendered in a lighter and/or more muted color than the original object. The visual cues of ghost images and perceptibly moving the object group members away from each other aids in associating the object group members in the members' original positions with the members in the members' "spread" positions.

Figure 1B:
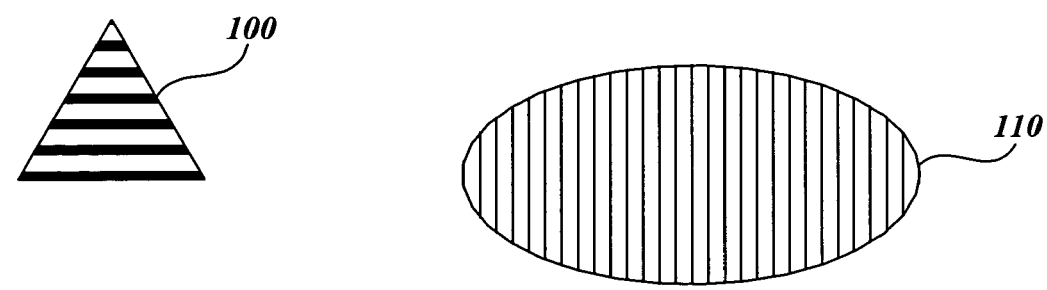
FIG. 1B is an exemplary expanded view of the three overlapping object group members shown in FIG. 1A.
Figure 1B:
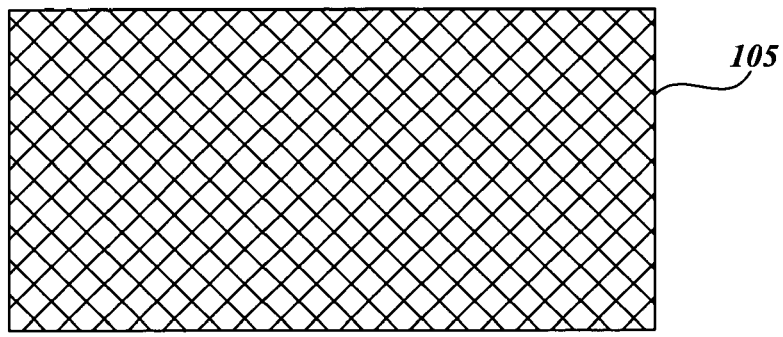

FIG. 1B shows the object group members of the exemplary 2D image shown in FIG. 1A, i.e., triangle 100, rectangle 105 and oval 110, in the objects' spread positions. For illustrative clarity, the ghost images of the object group members described above are not shown in any of the drawings. When spreading objects, e.g., object group members, it is preferable that the spread positions of the objects, as much as possible, preserve the relative spatial positions of the respective objects. For example, triangle 100 is to the left of rectangle 105 in the object group shown in FIG. 1A and also to the left in the spread object group shown in FIG. 1B. Preserving the relative spatial position of objects aids in associating objects in the objects' original positions with the objects in the objects' "spread" positions. An exemplary spreading process begins with a "rough" layout pass in which each object is scaled and then placed along a line passing through an origin and the center point of the object. The origin may be the object group's center of mass or the invocation point, i.e., the point where a user clicked to invoke the spreading action. An object is initially placed along the line at a distance from the origin that is proportional to the object's dimensions, i.e., the larger the object, the further away from the origin the object is placed. A second layout pass is made to move objects away from the edges of the display so that the objects are fully visible and to resolve remaining object overlaps by adjusting the position of pairs of objects in the object group. Spreading may be accomplished using other processes. The process described above should be construed as exemplary and not limiting.

Figure 1C:
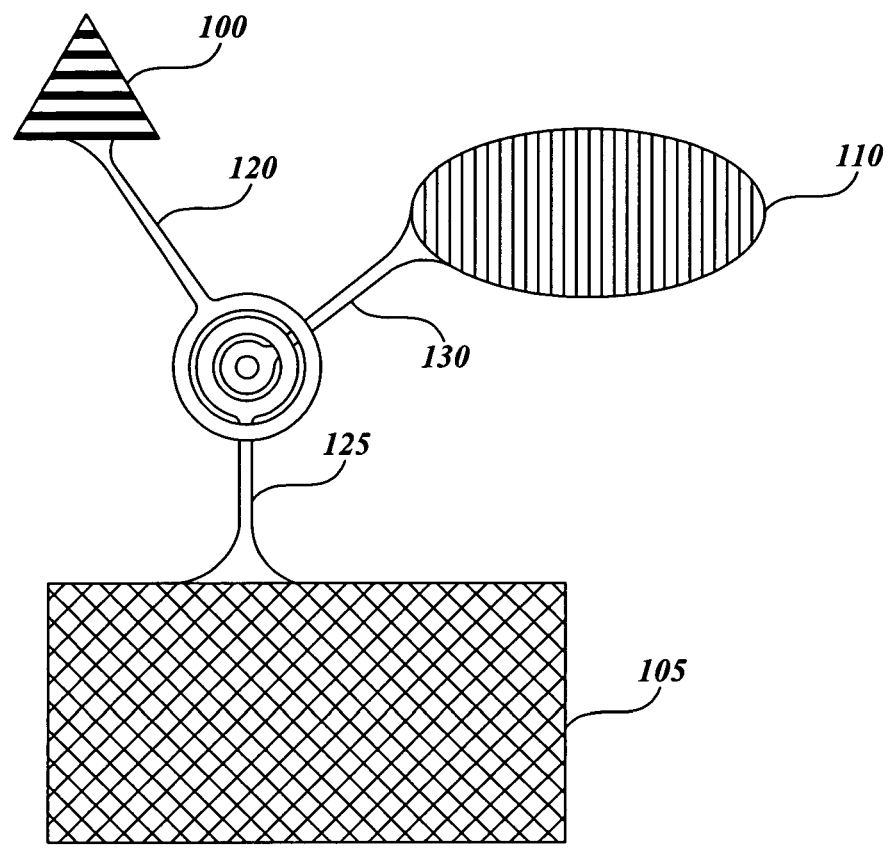
FIG. 1C is an exemplary expanded view of the three overlapping object group members shown in FIG. 1A with the object group members attached to beams connected to rings of an exemplary depth well.

After object group members have been spread, a "depth well" is placed at the object group's center. A depth well provides visual cues for indicating the relative depths of a plurality of objects and an affordance for making relative depth adjustments of the object group members. An exemplary depth well, placed at the object group center shown in FIG. 1B, is shown in FIG. 1C. As illustrated by the exemplary depth well shown in FIG. 1C, a depth well comprises a set of nested concentric "rings" that are connected to "beams." A beam connects a ring to an object group member. The rings are ordered such that the innermost ring is connected by a beam to the "deepest" object group member, i.e., the member behind all of the other members, and the outermost ring is connected by a beam to the "shallowest" object group member, i.e., the member in front of the other members. Rings between the innermost and outermost rings are nested to indicate the rings' depths relative to the innermost and outermost rings and are connected by beams to object group members with depths in between the deepest and shallowest object group members. A ring connected to a beam forms a "ring-beam pair," i.e., a ring-beam. For example, in FIG. 1C, triangle 100 is connected to ring-beam 120. The ring in ring-beam 120 is the outermost ring indicating that triangle 100 is the shallowest object group member. Rectangle 105 is connected to ring-beam 125. The ring in ring-beam 125 is inside of the ring of ring-beam 120 indicating that rectangle 105 is below triangle 100. Oval 110 is connected to ring-beam 130. The ring in ring-beam 130 is the innermost ring indicating that oval 110 is the lowest object group member.

Notice that overlapping the beam of a lower ring-beam with the rings from upper ring-beams is used as a visual cue to reinforce the understanding that a lower ring-beam is below an upper ring-beam. Other visual cues, such as differentiating the ring-beams using colors, indicating the depth of the ring-beams using transparency, using dotted lines to indicate hidden beams, etc. may be used to reinforce the perception that lower ring-beams are below upper ring-beams. Hence, overlapping the beams of lower ring-beams with the rings from upper ring-beams to suggest or indicate relative depth should be construed as exemplary and not limiting. It is also to be understood that visual cue shapes other than rings may be used—squares, triangles, or ovals, for example. Further, other types of depth showing visual cues other than ring-beam visual cues may be used in alternate embodiments of the invention.

Figure 1D:
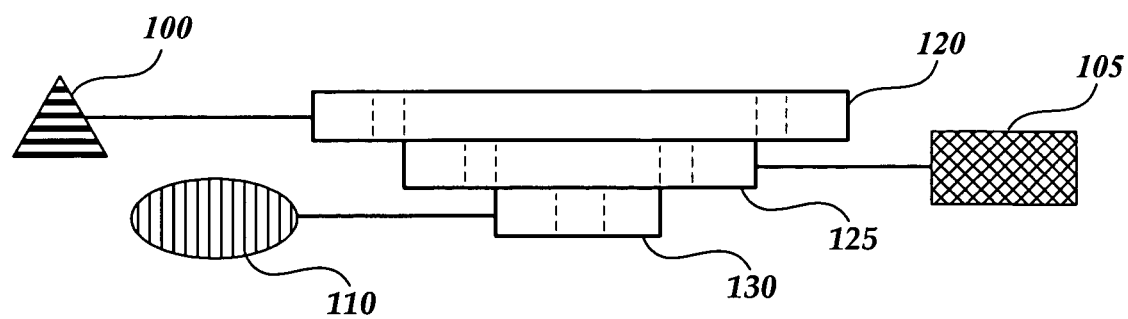
FIG. 1D is a "virtual" side view of an exemplary depth well for the three overlapping object group members shown in FIG. 1A.

To further clarify the concept of a depth well, FIG. 1D shows an exemplary "virtual" side view of a depth well. The virtual side view may or may not be implemented in a 2D graphic application in addition to the top view of a depth well and is presented here for clarification only. In FIG. 1D, it can be seen that triangle 100's ring-beam 120 is above rectangle 105's ring-beam 125 which is, in turn, above oval 110's ring-beam 130. Hence, triangle 100 is above rectangle 105 which is, in turn, above oval 110. Relative depth adjustments of object group members connected to a depth well can be made. An example of making relative depth adjustments of object group members connected to a depth well is illustrated by FIGS. 2A and 2B.

Figure 2A:
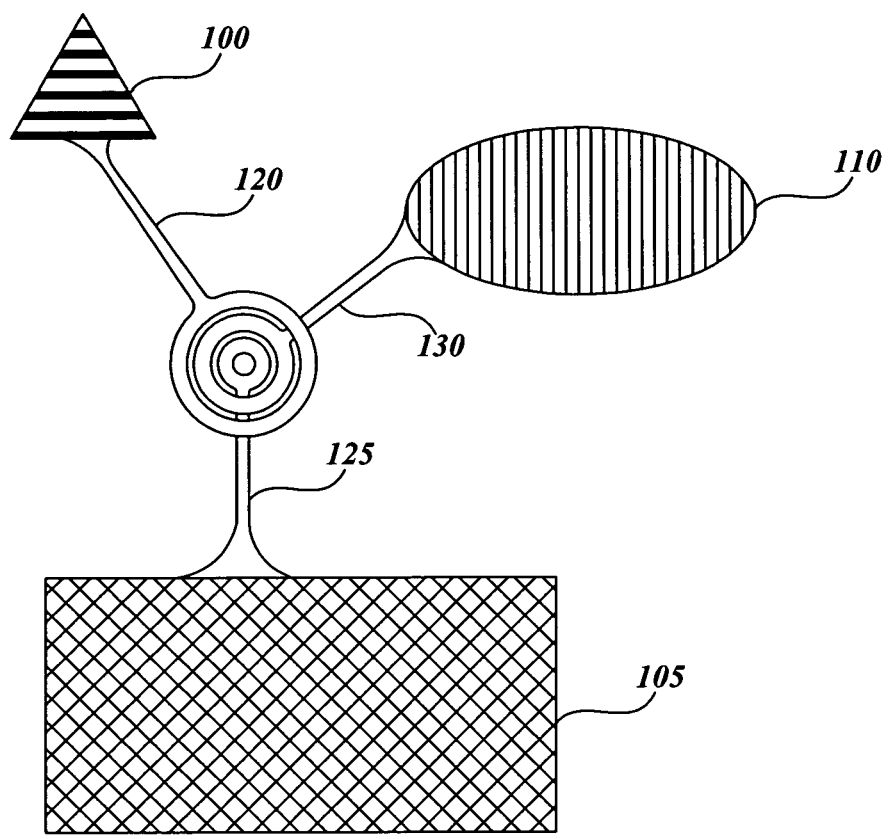
FIG. 2A is an exemplary expanded view of the three overlapping object group members shown in FIG. 1A with the oval moved in front of the rectangle and the object group members attached to beams connected to rings of an exemplary depth well.
Figure 6:
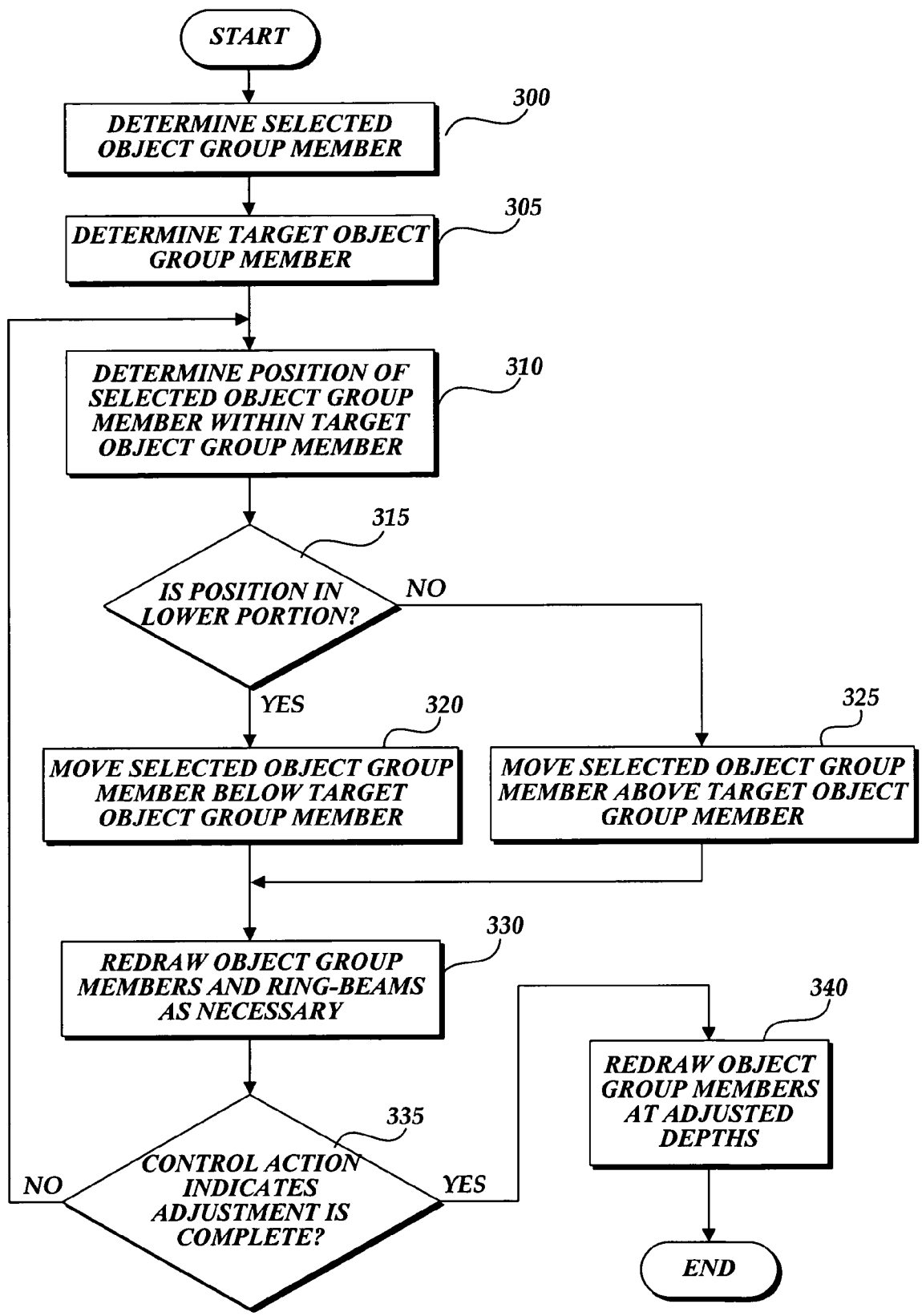
FIG. 6 is an exemplary functional flow diagram describing a control action for adjusting the relative depth of an exemplary object group member.

FIG. 2A shows the same object group members as the object group members shown in FIG. 1A, i.e., triangle 100, rectangle 105, and oval 110. As in FIG. 1C, the objects in FIG. 2A are connected to a depth well. Triangle 100 is connected to ring-beam 120. Rectangle 105 is connected to ring-beam 125. Oval 110 is connected to ring-beam 130. Unlike oval 110 as shown in FIG. 1C, oval 110 shown in FIG. 2A has been moved above rectangle 105 using a control action, such as the control action illustrated in FIG. 6 and described below. The effect of this control action causing a relative depth adjustment of oval 110 in relation to rectangle 105 can be seen by the change in the relationship of the ring-beams of oval 110 and rectangle 105 in the depth well. In FIG. 1C, the ring of ring-beam 130 for oval 110 is the innermost, and hence farthest back, ring in the depth well. In FIG. 2A, the ring of ring-beam 130 for oval 110 is connected the middle ring in the depth well. The appearance of the ring-beams 120, 125, and 130 have been changed to indicate that oval 110 is now in front of rectangle 105. Indeed, in FIG. 2B it can be seen that when the object group members are returned to their original positions in the X-Y plane, oval 110 is in front of, and no longer behind, rectangle 105. Triangle 100 remains in front of rectangle 105. Changing the depth of oval 110 in relation to rectangle 105, illustrated in FIGS. 2A and 2B and described above, may be accomplished by dragging oval 110 into the upper portion of rectangle 105. Changing the depth of oval 110 in relation to rectangle 105 may also be accomplished by dragging rectangle 105 into the lower portion of oval 110. The details of a control action using dragging to change depths are shown in FIG. 6 and described below.

Figure 2B:
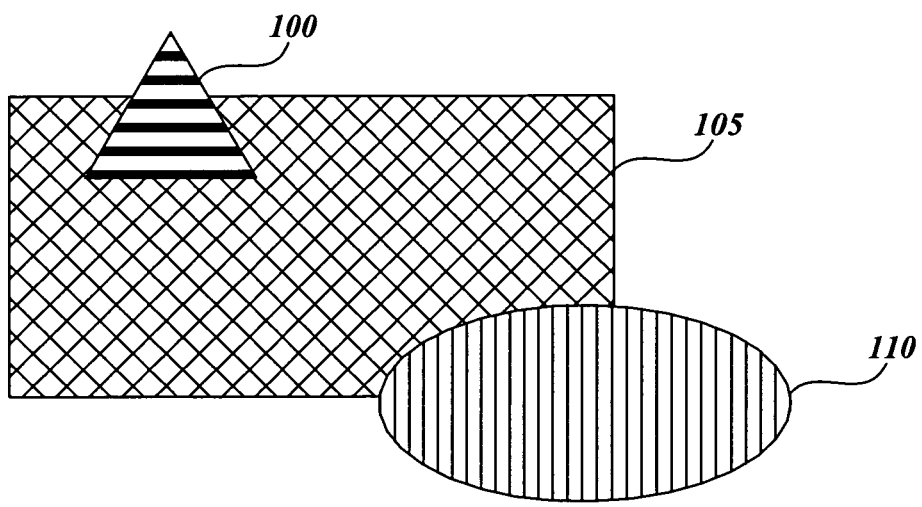
FIG. 2B is an exemplary view of the three overlapping object group members shown in FIG. 1A with the oval moved in front of the rectangle.
Figure 3A:
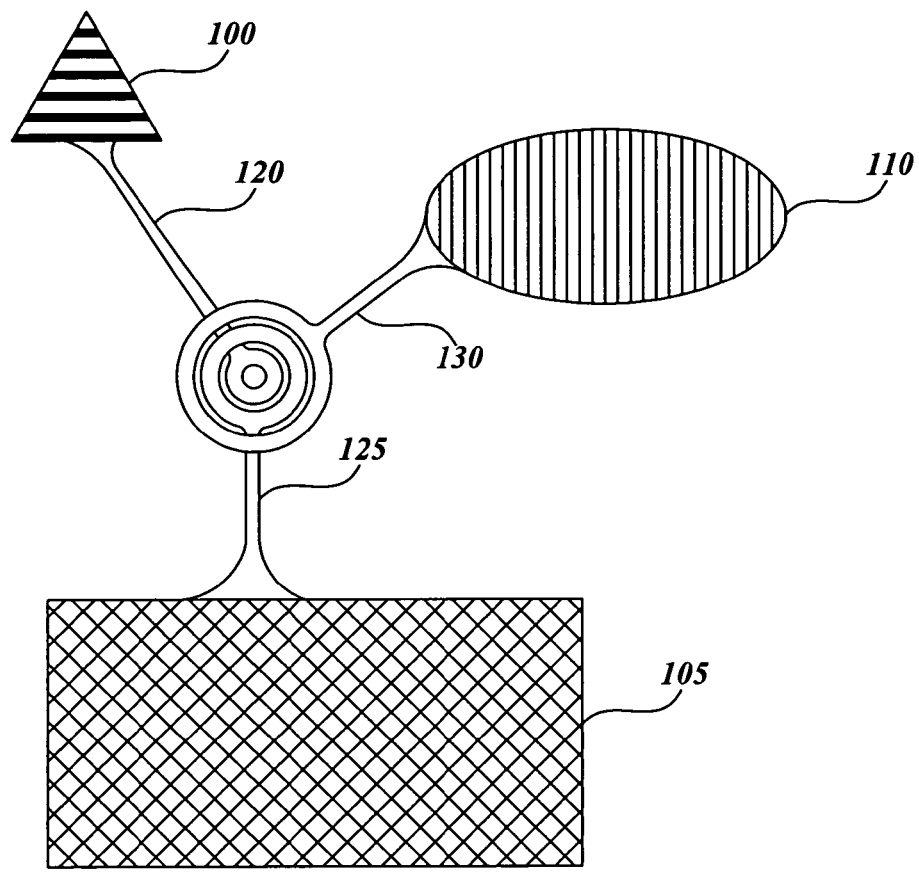
FIG. 3A is an exemplary expanded view of the three overlapping object group members shown in FIG. 2B with the triangle moved behind the rectangle and the objects attached to beams connected to rings of an exemplary depth well.
Figure 3B:
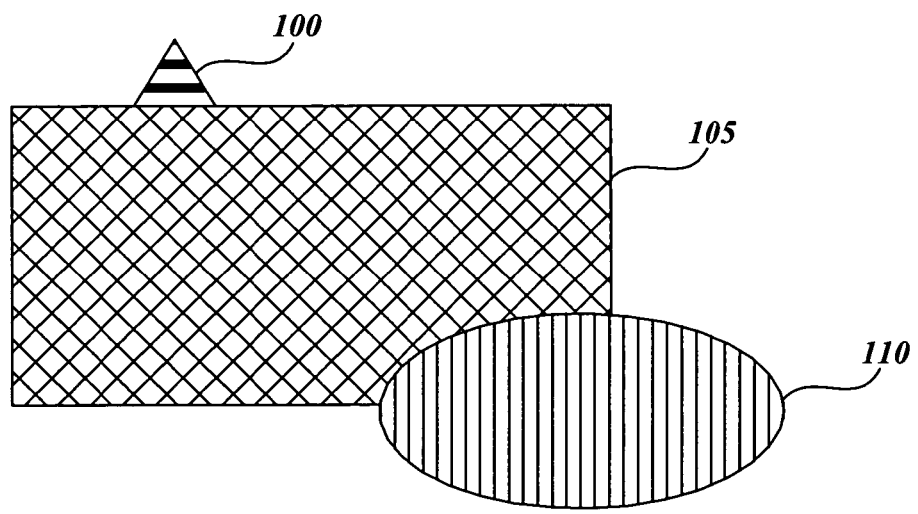
FIG. 3B is an exemplary view of the three overlapping object group members shown in FIG. 2B with the triangle moved behind the rectangle.

FIGS. 3A and 3B illustrate a relative depth adjustment similar to the depth adjustment illustrated in FIGS. 2A and 2B but in FIGS. 3A and 3B, the depth of rectangle 105 is changed. Rectangle 105 is moved in front of triangle 100. In FIG. 3A, ring-beam 130, connected to oval 110, indicates that oval 110 is the uppermost object. Ring-beam 125, connected to rectangle 105, indicates that rectangle 105 is the middle object. Ring-beam 120, connected to triangle 100, indicates that triangle 100 is now the lowest object group member. In FIG. 3B, the object group members are returned to their original positions in the X-Y plane with triangle 100 now being the lowest object, rectangle 105 being the middle object group member, and oval 110 being the uppermost object group member.

Figure 4A:
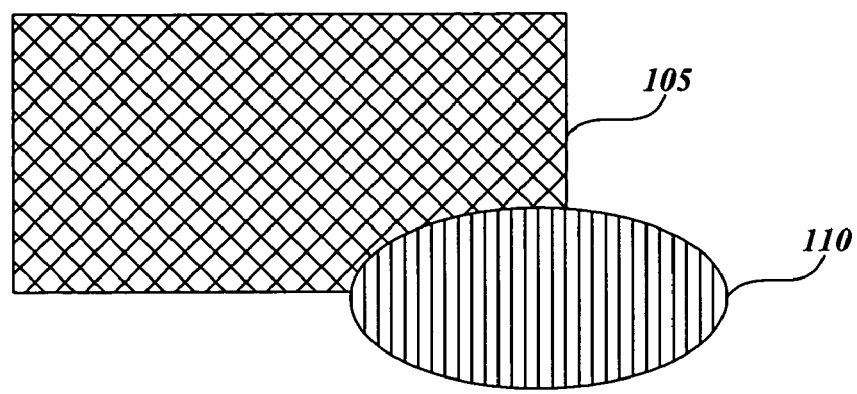
FIG. 4A is an exemplary view of the three overlapping object group members shown in FIG. 3B with the triangle hidden behind the rectangle, i.e., occluded by the rectangle.
Figure 4B:
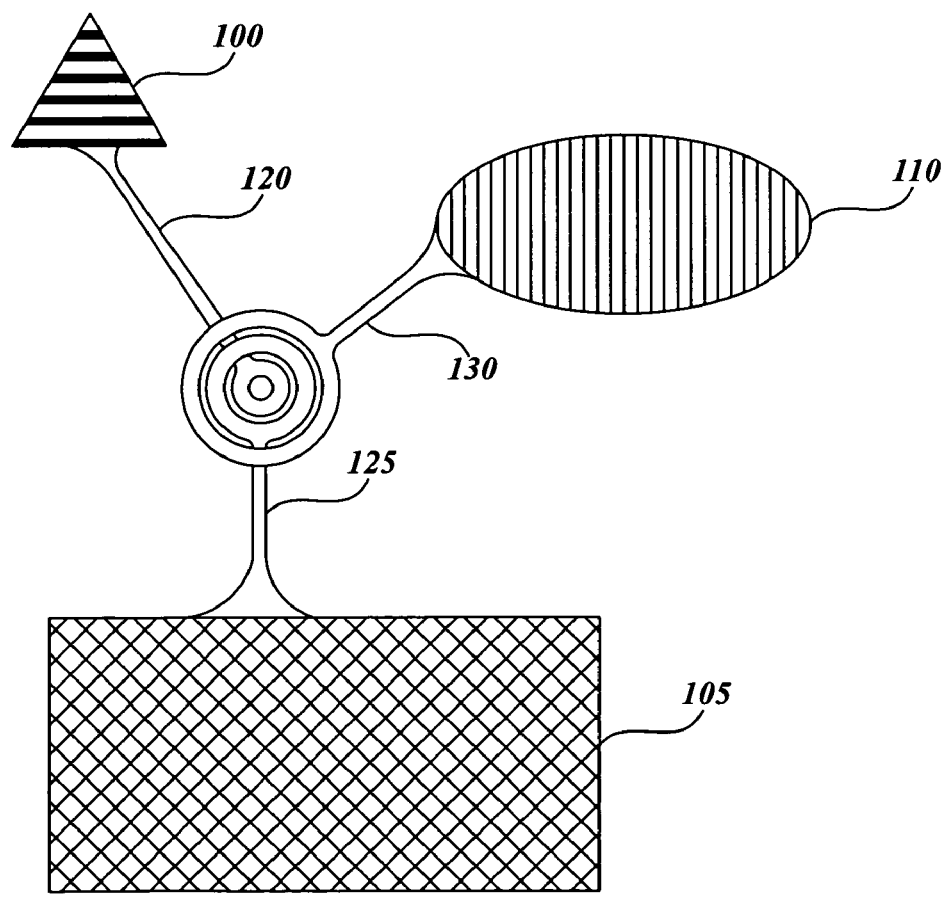
FIG. 4B is an exemplary expanded view of the three overlapping object group members shown in FIG. 3B with the objects attached to beams connected to rings of an exemplary depth well so that the occluded triangle is visible and accessible.

Unlike FIGS. 1A-3B, FIGS. 4A and 4B do not illustrate a relative depth adjustment but instead illustrate a change in the X-Y position of triangle 100 causing triangle 100 to be completely overlapped by, i.e., occluded by, rectangle 105. Except for the X-Y position change of triangle 100, FIG. 4A is similar to FIG. 3B. In particular, the depths of triangle 100, rectangle 105, and oval 110 shown in FIG. 4A are the same as the depths of triangle 100, rectangle 105, and oval 110 shown in FIG. 3B. The X-Y positions of rectangle 105 and oval 110 shown in FIG. 4A are the same as the X-Y positions of rectangle 105 and oval 110 shown in FIG. 3B. Because, in FIG. 4A, triangle 100 is occluded, triangle 100 is no longer accessible. Because, in FIG. 4B, the objects have been spread and a depth well inserted, triangle 100 is visible and accessible. The depth well enables relative depth adjustment of the object group members connected to the depth well including the occluded object triangle 100.

Figure 5:
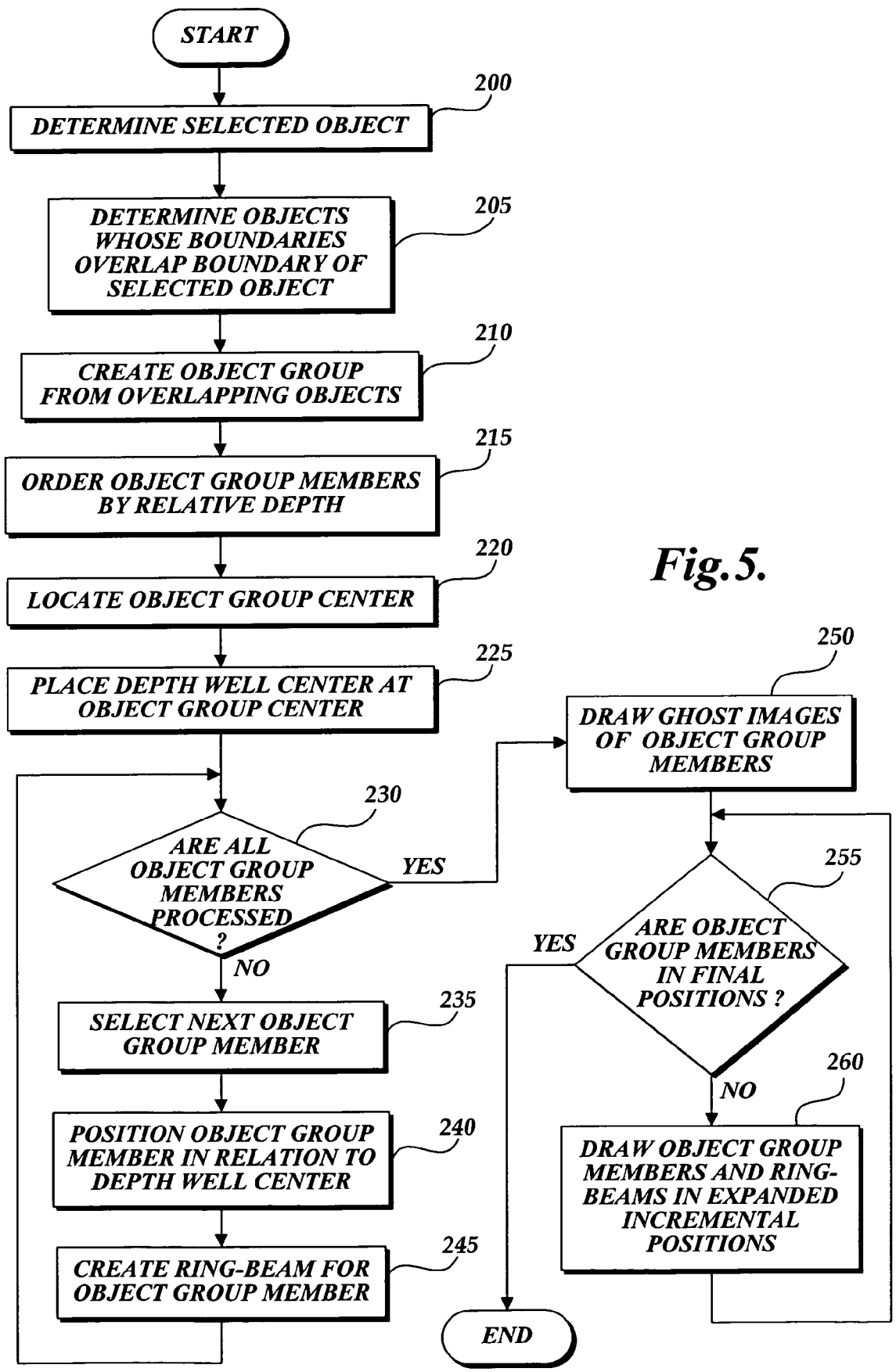
FIG. 5 is an exemplary functional flow diagram describing how an exemplary object group is formed and expanded using a depth well.

FIG. 5 is an exemplary functional flow diagram describing how an exemplary object group, such as the object group shown in FIG. 1C, is formed and spread and how a depth well, such as the depth well shown in FIG. 1C, is created and inserted into the object group. At block 200, a selected object is determined. For example, triangle 100 may be selected. At block 205, objects whose boundaries overlap boundaries of the selected object are determined. For example, in FIG. 1A, triangle 100 overlaps rectangle 105 which in turn overlaps oval 110. At block 210, an exemplary object group is created from the overlapping objects, i.e., the objects that overlap the selected object. At block 215, the object group members are ordered according to the relative depths of the object group members. At block 220, the object group center is located. At block 225, the depth well center is placed at the object group center. For example, the center of the depth well shown in FIG. 1C is located at the object group center of the object group triangle 100, rectangle 105, and oval 110. At block 230, a decision is made as to whether all object group members are processed. If, at block 230, all object group members are not processed, the control flows to block 235. At block 235, the next object group member is selected. At block 240, the object group member is positioned in relation to the depth well center, i.e., moved away from the depth well center. For example, triangle 100, shown in FIG. 1B, is moved away from the depth well center. At block 245, a depth ring is created for the object in accordance with the depth of the object group member relative to the other object group members and a beam is created for the object group member forming a ring-beam connected to the object group member. For example, ring-beam 120 is created for triangle 100, shown in FIG. 1C. If, at block 230, all of the object group members are processed, then the control flows to block 250. At block 250, ghost images of each object group member are drawn. Blocks 255 and 260 comprise a loop in which the object group members are moved into their final positions using incremental positioning. Incremental positioning enables object group members to be moved away from each other at a slow enough speed that the action is perceptible by users. At block 255, a check is made to determine if the object group members are in their final positions. If, at block 225, the object group members are not in their final positions, the control flows to block 260. At block 260, the object group members and ring-beams are drawn in their expanded incremental positions. For example, in FIG. 1C, triangle 100 may be drawn at a position midway between the center of the depth well and triangle 100's final position. Ring-beam 120, which is connected to triangle 100, is drawn to accommodate this midway position. If, at block 255, all of the objects are in their final positions, the control flow ends.

Figure 7A:
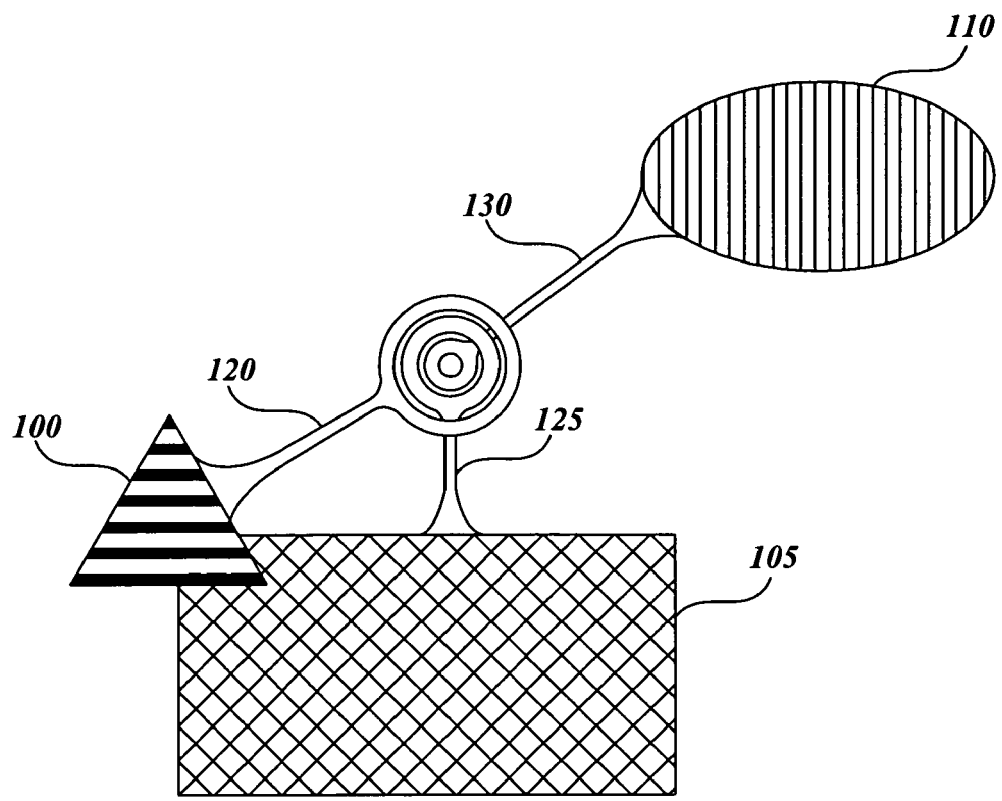
FIG. 7A is an exemplary expanded view of the three object group members shown in FIG. 3B with the objects attached to beams connected to rings of an exemplary depth well and one object dragged into the upper portion of another object.

FIG. 6 is an exemplary functional flow diagram describing how to make a relative depth adjustment of an exemplary object group member by using the control action of dragging an object group member over another object group member. An example of dragging an object group member over another object group member is shown in FIG. 7A. In FIG. 7A, triangle 100 is in the upper portion of rectangle 105. Ring-beam 120 for triangle 100 is attached to triangle 100; ring-beam 125 is attached to rectangle 105; and ring-beam 130 is attached to oval 110. The process begins in FIG. 6 at block 300 in which the selected object group member is determined. In FIG. 7A, triangle 100 is an exemplary selected object group member. At block 305 a target object group member is determined. An object group member is determined to be a target object group member when a selected object group member is dragged over the object group member. The object group member that is dragged over is the "target" of the dragging action. For example, in FIG. 7A, triangle 100 is dragged over rectangle 105. Thus, rectangle 105 is determined to be a target object group member. At block 310 the X-Y position of the selected object group member within the target object group member is determined. The position of the selected object group member in relation to the target object group member is either in the upper portion, i.e., top half, of the target object group member or in the lower portion, i.e., bottom half, of the target object group member. For example, in FIG. 7A, triangle 100 is above the vertical midpoint of rectangle 105, i.e., the midpoint along an imaginary Y axis running through rectangle 105. Thus, triangle 100 is determined to be in the upper portion of rectangle 105.

Figure 7B:
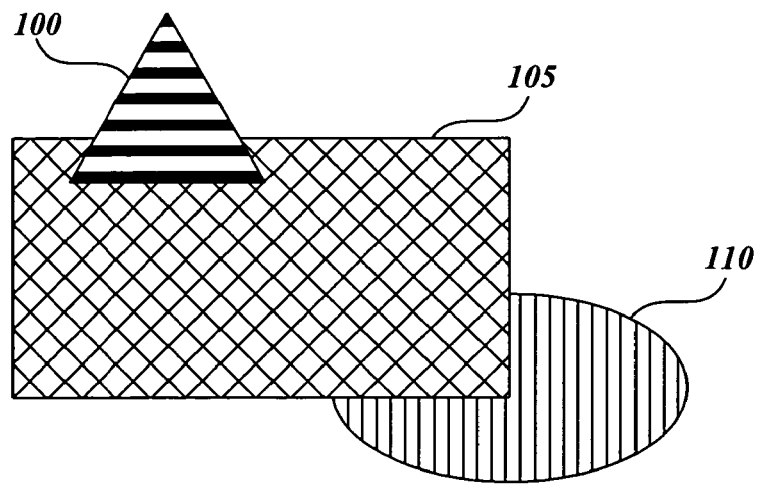
FIG. 7B is an exemplary view of the three object group members shown in FIG. 7A with the dragged object shown at the adjusted depth.

In FIG. 6, at block 315, a decision is made about the position of selected object group member in relation to the target object group member. If, at block 315, the selected object group member is in the upper portion to the target object group member, then the control flow proceeds to block 325. For example, in FIG. 7A, triangle 100 is in the upper portion of rectangle 105. Thus, the control flow proceeds to block 325. At block 325, the relative depth adjustment of the selected object group member is made so that the selected object group member is moved above the target object group member and the control flows to block 330. For example, in FIG. 7A, triangle 100 is moved above rectangle 105. If, at block 315, the selected object group member is in the lower portion to the target object group member, then the control flow proceeds to block 320. At block 320 the depth of the selected object group member is adjusted so that the selected object group member is moved below the target object group member. The control flow then proceeds to block 330. At block 330 group members and ring-beams are redrawn as necessary to reflect depth changes. At block 335 control actions are detected and analyzed. If, at block 335, a control action indicates that the relative depth adjustment is complete, the control proceeds to block 340. For example, in FIG. 7A, an exemplary control action is to unselect triangle 100 causing the control to proceed to block 340. If, at block 335, no control action indicating that the relative depth adjustment is complete is detected, the control flow returns to block 310. At block 340 the depth well is removed, the object group members are moved back to their original positions in the X-Y plane, and the object group members are redrawn at the adjusted depths. For example, in FIG. 7B, triangle 100 is redrawn at an adjusted depth, i.e., in front of rectangle 105. After block 340 the control flow ends.

Depth wells are member relationship diagrams. A member relationship diagram shows the relationship of group members in accordance with a parameter common to the group members, e.g., relative depth. Each group member has a value for the common parameter, i.e., each shape has a relative depth. Other member relationship diagrams are possible for other parameters, e.g., relative size. For example, a member relationship diagram similar to a depth well, e.g., a size well, could be constructed to show the sizes of group members relative to one another. A size well may then be used to enable the resizing of one member compared to another. Using a size well, one group member may be moved over another group member to increase or decrease the size of the moved group member. Hence, the use of depth as a parameter in a member relationship diagram should be construed as exemplary and not limiting.

While illustrative embodiments have been illustrated and described, it will be appreciated that various changes can be made therein without departing from the spirit and scope of the invention. For example, an object group may be formed by enabling direct selection of objects for the object group.

The invention claimed is:

1. A method of displaying relative depths of objects in a 2D image while preserving visual attributes of the objects, the method comprising using a computing device to perform the following computer-executable acts:
in response to selecting an object, determining an object group;
temporarily moving members of the object group away from their original positions while preserving the relative positions of the members of the object group in an X-Y plane and removing an overlap between the members;
displaying a member relationship diagram in a region between non-overlapping members;
connecting each member of the object group to the member relationship diagram such that a relationship of a parameter of each member of the object group is displayed;
in response to a control action indicating an adjustment of the parameter of a member of the object group relative to the remaining members of the object group, changing the parameter of the object group member relative to the remaining members of the object group; and in response to a control action indicating that the adjustment is complete, returning members of the object group to their original positions in the X-Y plane and displaying the adjusted object group member with the adjusted object group member's changed parameter.

2. The method of claim 1, wherein the member relationship diagram is a depth well and wherein the parameter is a relative depth of a member of the object group.

3. The method of claim 2 wherein the depth well comprises a plurality of nested concentric elements and wherein said nested concentric elements are each connected to a member of the object group by a beam.

4. The method of claim 2 wherein a control action causing a relative depth adjustment of an object group member relative to the remaining object group members is dragging an object group member into an upper portion of another object group member.

5. The method of claim 2 wherein a control action causing a change in the depth of an object group member relative to the remaining object group members is dragging object group member into a lower portion of another object group member.

6. The method of claim 2, further comprising indicating relative depth using transparency.

7. The method of claim 1 wherein the visual attributes comprise one or more of shape, color, size, and X-Y position.

8. The method of claim 1 wherein an object group comprises a selected object and objects that overlap the selected object.

9. The method of claim 1, further comprising differentiating connections between members relative to each other using colors.

10. The method of claim 1, further comprising displaying ghost images of the members of the object group at the original positions of the members of the object group.

11. A computer-readable medium, including computer-executable instructions that, when executed by a computing device, cause the computing device to display relative depths of 2D image objects by:

determining, in response to user input, a group of overlapping objects ("an object group");

moving members of the object group into non-overlapping positions;

displaying a depth well in a region separating the non-overlapping positions; and connecting each member of the object group to the depth well in a manner such that a relative depth of each member of the object group is displayed.

12. The computer-readable medium of claim 11 wherein the object group comprises a plurality of selected objects.

13. The computer-readable medium of claim 11 wherein the object group comprises a plurality of objects.

14. The computer-readable medium of claim 11 wherein the depth well comprises a plurality of nested concentric elements equal in number to the number of members of the object group.

15. The computer-readable medium of claim 14 wherein the nested concentric elements are each connected to a related one of the members of the object group by a beam.

16. The computer-readable medium of claim 14 wherein the nested concentric elements are rings.

17. The computer-readable medium of claim 16 wherein the nested concentric rings are each connected to a related one of the members of the object group by a beam, thereby creating ring-beams.

18. The computer-readable medium of claim 17 wherein the ring-beams are differentiated by color.

19. The computer-readable medium of claim 17 wherein transparency is used to indicate a depth of the ring-beams.

20. The computer-readable medium of claim 11 also comprising displaying ghost images of the members of the object group at the original positions of the members of the object group.

21. A method comprising
using a computing device to perform the following computer-executable acts:

displaying overlapping graphical objects having relative depths with respect to each other;

separating the graphical objects so that the graphical objects no longer overlap;

displaying a graphical link between the separated graphical objects; and including, in the displayed graphical link, overlapping portions corresponding to the relative depths of the graphical objects.

* * * * *